Patented Apr. 12, 1932

1,853,348

UNITED STATES PATENT OFFICE

IVAN GUBELMANN AND CLYDE O. HENKE, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ABIETANE SULPHONIC ACIDS AND THE PROCESS OF PREPARING THEM

No Drawing.   Application filed February 26, 1930.   Serial No. 431,627.

This invention relates to water soluble organic products and to a process of preparing the same, and more particularly to a process for preparing such products by sulphonating hydrogenated abietenes, that is abietanes. This starting material may be suitably prepared in accordance with the disclosure of our co-pending application Serial No. 431,626, filed of even date herewith, that is by reacting abietene with hydrogen at elevated temperature and pressure in the presence of reduced nickel as a catalyst until no more is being absorbed.

We have found that abietanes, as prepared according to our said co-pending application, can be sulphonated to produce products which, together with their alkali metal salts, are soluble in water.

It is accordingly, an object of this invention to provide a method of preparing water soluble products of various abietanes. Many of these products, because of their excellent wetting and immersing properties, can be advantageously utilized in the textile industries for a variety of purposes for which bodies of similar properties have been formerly employed.

It is a further object of this invention to provide a process for sulphonating hydrogenated abietenes, that is abietanes.

Other and further important objects will become apparent from the following description and appended claims.

In carrying out the sulphonation process, it has been determined that the amount of acid necessary for complete sulphonation is directly dependent upon the strength of acid employed. For example, a longer time and more acid is necessary in sulphonating with 93%-sulphuric acid than is the case if sulphuric acid monohydrate is used. On the other hand, even less acid is necessary if the sulphonation is carried out with a mixture of sulphuric acid monohydrate and 25% oleum. The sulphonation can also be effected with other sulphonating agents, such, for instance, as chloro-sulphonic acid.

Preferably, the sulphonation, irrespective of the particular sulphonating agent employed, is carried out at temperatures below room temperature, that is, from 0 to 20° C. If higher temperatures are used, 75 to 100° C. for instance, sulphonation proceeds in substantially the same way, but side reactions, accompanied by the evolution of large quantities of sulphur dioxide, occur, with the result that the product obtained is dark in color. Sulphonation at these higher temperatures should, therefore, be avoided.

The sulphonic acid resulting from this process appears to be technically separable from sulphuric acid directly, in various acid strengths, and, for this reason, can be isolated from the reaction mass in a novel manner for this type of product.

In sulphuric acid of 10% concentration or less, however, the free sulphonic acid is highly soluble and cannot be directly separated except by extraction with a non-miscible solvent. At about 90% sulphuric acid concentration, although the sulphonic acid is fairly insoluble in the sulphuric acid, such a large amount of sulphuric acid is absorbed in the sulphonic acid layer that the amount of alkali required for neutralization is greater than should be necessary for the neutralization of the sulphonic acid alone, and, consequely, the final product is quite highly contaminated with sulphuric acid salts. Accordingly, we prefer to make our separation in a concentration of approximately 50% sulphuric acid, since, under these conditions, a good yield of the sulphonic acid is obtained and furthermore only a small amount of the sulphuric acid is retained in the resulting product.

The following example, in which parts by weight are given, serves to illustrate a preferred form of our invention.

Example 1,000 parts of sulphuric acid (monohydrate) are cooled to 10° C., and, while stirring, 500 parts of an abietane material are added over a period of two hours. The mass while being maintained at a temperature of from about 0 to 15° C. is stirred for an additional 20 hours and is then poured into 1000 parts of water to effect a separation into layers. Although the layers so formed can be separated from each other while hot, it is preferable to first allow the mass to cool to room temperatures. The dilute sulphuric acid layer is then separated from the sulphonic acid layer (upper layer) and the sulphuric acid discarded. The sulphonic acid, which is in the form of an oily paste, is dissolved in water and neutralized with caustic soda solution. The neutral solution is then filtered to remove a small amount of solid material and the filtrate evaporated to dryness, whereupon a pale, cream colored product is obtained. The sulphonic acid of this product is very soluble in water.

If, in the above process, other neutralizing agents are employed, such as, for example, sodium carbonate, potassium hydroxide, ammonium hydroxide or the like, the corresponding water soluble salts are obtained, all of which, find ready employment in various industries.

These new sulphonic acid products, either in the form of the free acid or in the form of water soluble salts, possess remarkable properties as regards surface tension and capillarity effects in solution. They are highly adapted for use as emulsifying and solubilizing agents for water immiscible or only slightly miscible solvents. They may be employed either as indicated above, or in combination with water miscible or immiscible alcohols, ketones or the like, as pasting, cleansing, lathering, wetting or fulling agents in the dye, paper, textile and leather industries. They may be used in acid, neutral or alkaline baths and, therefore, find application in the laundering, dyeing, bleaching, carbonizing, mercerizing and finishing of textiles. All the above properties may be summarized under the statement that our novel products are characterized by great capillaractivity. However, it should be understood that we do not claim to be the first or exclusive inventors of the above various uses and applications.

It is, of course, to be understood that other ratios of reacting materials may be employed in the above example of our process. It is also possible to reverse the addition procedure, that is, the sulphuric acid may be added to the abietane. Similarly, as stated above, chloro sulphonic acid may be used as the sulphonating agent in place of the sulphuric acid.

As an alternative, but not a preferred method, the sulphonated mass may be added to water and used as such or the aqueous acid solution may be neutralized with a base, such as caustic soda, potassium carbonate, ammonium hydroxide or the like. This neutralized solution may then be either used directly or it may be evaporated to dryness to recover the sulphonic acid salt.

We are aware that numerous details of the process may be varied through a wide range without departing from the principles of this invention, and we, therefore, do not purpose limiting the patent granted hereon, otherwise than necessitated by the prior art.

We claim as our invention:

1. The process of preparing water soluble compounds which comprises reacting an abietane body with strong sulphonating agents.

2. The process of preparing water soluble compounds which comprises reacting an abietane body with concentrated sulphuric acid.

3. The process of preparing water soluble compounds which comprises treating an abietane body with concentrated sulphuric acid at a temperature of from 0 to 20° C.

4. The process of preparing water soluble organic compounds which comprises treating an abietane body with sulphuric acid monohydrate at a temperature of from 0 to 20° C.

5. The process of preparing water soluble compounds which comprises treating an abietane body with concentrated sulphuric acid at a temperature ranging from 0 to 50° C., diluting the reaction mass to a sulphuric acid concentration of above 10% but below 90% and mechanically separating the sulphonated abietane layer thus produced.

6. The process of preparing water soluble compositions which possess high capillar-activity which comprises reacting with strong sulphonating agents the product obtained by hydrogenating abietene-containing material.

7. As new products of manufacture, water soluble, cappillaractive bodies of the group consisting of sulphonated abietane and salts of sulphonated abietane.

8. As new products of manufacture, water soluble compounds which may be prepared by treating an abietane body with strong sulphonating agents at a temperature of from between 0 to 50° C.

9. As new products of manufacture, water soluble compounds possessing high capillar-activity, and being substantially identical with the product obtained by sulphonating hydrogenation derivatives of abietene-containing material.

10. As new products of manufacture, water soluble compounds which may be prepared by treating an abietane body with strong sulphonating agents at a temperature of from between 0 to 50° C. and neutralizing the sulphonation product with an alkali.

11. As new products of manufacture, water soluble compounds possessing high capillar-activity, and being substantially identical with the product obtained by sulphonating hydrogenation derivatives of abietene-containing material and neutralizing the sulphonation product with an alkali.

In testimony whereof, we have hereunto subscribed our names at Carrollville, Milwaukee County, Wisconsin.

IVAN GUBELMANN.
CLYDE O. HENKE.